Patented Sept. 4, 1923.

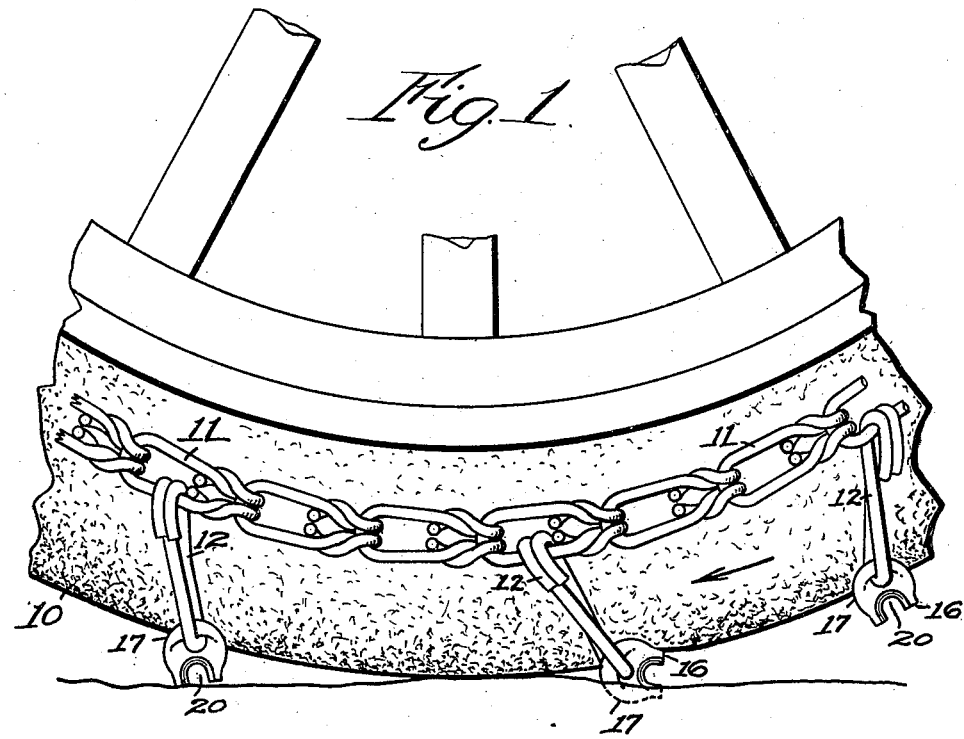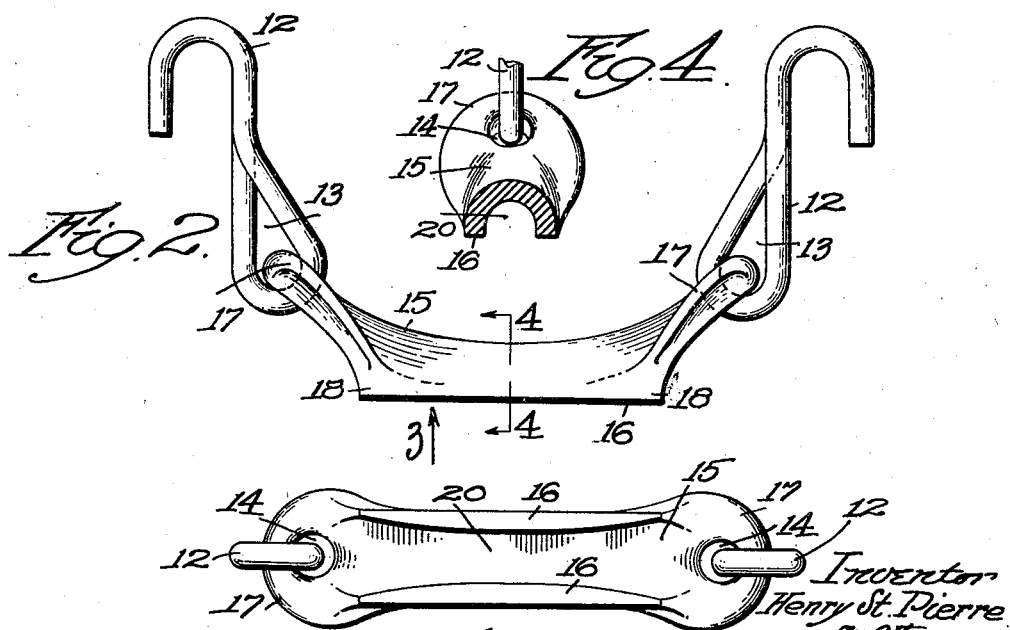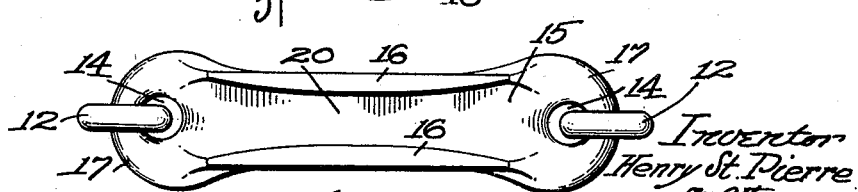

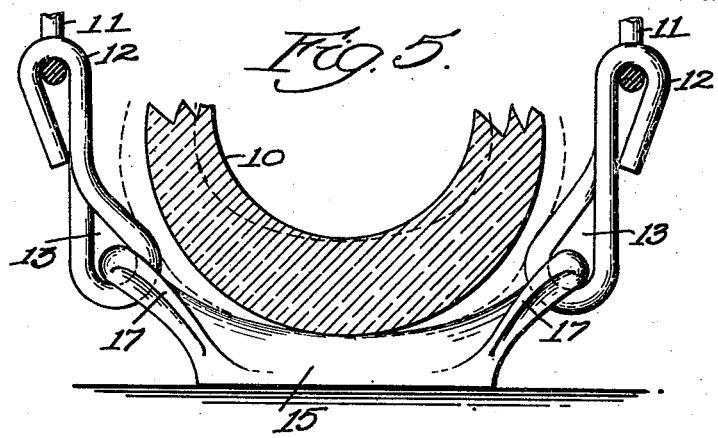
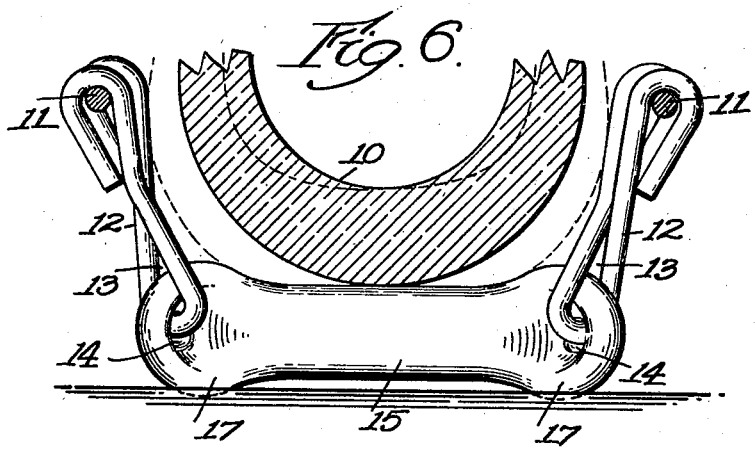
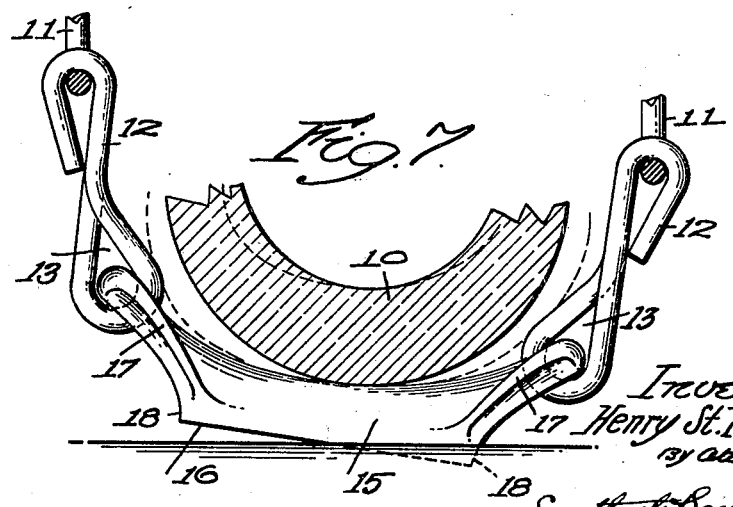

1,467,114

UNITED STATES PATENT OFFICE.

HENRY ST. PIERRE, OF WORCESTER, MASSACHUSETTS.

ANTISKID DEVICE.

Application filed September 15, 1921. Serial No. 500,765.

*To all whom it may concern:*

Be it known that I, HENRY ST. PIERRE, a citizen of the United States, residing at Worcester, in the county of Worcester and State of Massachusetts, have invented a new and useful Antiskid Device, of which the following is a specification.

This invention relates to an improvement over the anti-skid device in my Patent No. 1,363,994 granted December 28, 1920.

The principal objects of the present invention are to improve the details of such an anti-skid device so as to increase its strength and durability and especially to add to its efficiency for the purpose of preventing skidding. These objects are obtained by modifying it in several ways. I have constructed it so that the surfaces which engage the ground are flat instead of convex to get the full efficiency of the device when it is first applied. I have provided the side edges in such a form that if the whole device tends to slide sideways on the street this action will be resisted owing to the fact that these edges gradually converge toward the center. I have provided side flanges at the ends so shaped as to dig into the ground in case of skidding when the device turns over into transverse position and I have provided corners at the ends of the above mentioned flat surfaces which will dig into the ground in case the device slips around the tire slightly so as to bear only at one end. I have improved the details of construction in several ways in order to secure the above mentioned results more efficiently.

Reference is to be had to the accompanying drawings, in which—

Fig. 1 is a side elevation of a part of a wheel and tire with a preferred embodiment of this invention applied thereto and shown in action;

Fig. 2 is a front elevation of one of the anti-skidding elements removed from the wheel;

Fig. 3 is an outer plan view of the same;

Fig. 4 is a central sectional view on the line 4—4 of Fig. 2;

Fig. 5 is a view similar to Fig. 2 showing a tire in its normally fully expanded position and also showing it in dotted lines in the position that it would assume if the tire were partly deflated;

Fig. 6 is a similar view showing the action under both of the above mentioned conditions when the anti-skid device turns over to resist skidding; and Fig. 7 is a similar view showing the positions assumed if the anti-skid device gets shifted on the tire.

I have shown the invention as applied to a tire 10 having a pair of chains 11 extending around it on opposite sides. These chains are arranged somewhat loosely as will be observed by comparing the distance between the chain and the rim at the center and at the sides of Fig. 1. The anti-skid device comprises a pair of links 12, each one having an eye 13 passing through a perforation 14 in the end of the tread member 15. It will be understood from Fig. 2 that each of these links is connected with one end of the tread member in such a way as to permit full pivotal motion of the same. The parts, as far as described above, correspond in a broad way with the corresponding elements shown in my above mentioned patent. The chain is left loose for the same purpose as described in that patent and the tread member is arranged to turn over into the position illustrated at the center of Fig. 1 in the same way when the wheel commences to skid.

I will now describe certain improvements not illustrated therein. In the first place the tread member is made substantially flat on the outer surface by providing a pair of flat tread edges 16 instead of the curved formation shown in said patent and I also terminate the tread members substantially at the circumference of the tire instead of bringing them all the way around to a point near the rim. The effect of this latter change is to free the ends 17 of the tread members and to bring them to a position in which one edge of the same will cut into the ground when the tread member is turned over into the position shown in Fig. 6 and at the center in Fig. 1. These edges 17, as clearly appears in Figs. 3 and 6, are located below the adjacent surfaces of the tread member and therefore are especially effective for preventing skidding. In fact, I have shown these ends 17 as being substantially circular and having a diameter considerably greater than the width of the tread member elsewhere.

On account of making the edges 16 straight and shaping the ends 17 up from them, I provide sharp corners 18 which have a function of importance whenever these tread members get shifted on the tire as indicated in Fig. 7. In such a case as that, one corner or the other will dig into the ground and assist in giving the necessary grip on the ground and will materially assist in tipping the device over if the wheel starts to skid.

It is also to be noted that the edges 16 are much wider at the center than they are at the ends, though parallel on their outer edges, so that the groove 20 between them is narrow at the center and wide at the ends. If, while they move along in the regular way, there is a tendency to slip sideways, while the anti-skid devices are in their normal position as shown in the ends at Fig. 1, this will be resisted. The dirt and gravel of the road will start into the groove 20 easily enough but as it gets into the mouth of it, it will become crowded owing to the converging shape of the groove and the wheel will be resisted from further slipping to the side. This kind of sliding motion is resisted by the ends of the tread members which are thicker than their centers and so produce a wedge action at the end to interpose an additional resistance against side slipping. In this way a thick body is encountered by the tire only after it starts to slip. When turning in the ordinary way, the tread member under it is comparatively thin and does not materially affect the riding.

It will be understood, of course, that, as in my above mentioned patent, the normal action of this device is to rest somewhat loosely on the surface of the tire and allow both edges 16 to project down from it in a radial direction and they normally strike the ground in that position. Ordinarily, on account of the looseness of the chain, they rest on the ground for a period slightly longer than that during which any point on the tire is in contact with the ground. When the tire passes over it, both edges 16 come in contact with the ground simultaneously, and later leave it simultaneously. Now, if during that action the wheel starts to skid, the unusual resistance is applied to the front edge 16 and this forward edge is retarded so much that the anti-skid member 15 tips over so that it rests, as shown in Fig. 6 and also in the middle of Fig. 1, on the outer convex side of the forward edge 16 and on the enlargements 17 at the ends. Now the weight bearing down on the tread member causes its edge 16 to press against the ground and the edges of the enlargement 17 to bight into the ground. Both these results materially resist the skidding action. This resists skidding in two ways. First, by resisting the sliding itself and second, by presenting a higher surface to the tire, as shown by comparison of Figs. 5 and 6, which tends to cause the tire to start to roll. If it continues to skid when the next anti-skid member comes into contact with the ground, this action will be repeated again and the resistance increased.

It is to be noted, as stated above, that I have shortened the ends of the tread member, and leave said ends in a position to flare out at the sides instead of bringing them around into parallel position. One of the advantages is indicated in Fig. 5 where the tire in its normal position, is shown in full lines and in a flattened condition in dotted lines. With this construction it will be observed that in either case the device will be operated positively, being unrestricted by any pressure of the tire against the sides of the tread member. This also appears in Fig. 6 while in Fig. 7 it will be seen that the functions of the corner 18 can be taken advantage of whether the tire is blown up hard or not.

In my other device as shown in said patent, the tire rested on the concave side of the tread member as in this case. But in the former case, heavy pressure transmitted through the tire might bear too heavily on the ends of the tread member and tend to straighten it out. This is entirely avoided by the provision of the sharp corners 18 and the flat bottom of the tread members. These features also act in conjunction with the upper concave surface to bring the tread members back to central position if it gets over to one side.

While skidding, the tread member will remain in the position shown at the bottom of Fig. 1 on account of the resistance offered by the road surface to the bottom of the tread member. When it stops skidding, however, this resistance at once disappears and the weight of the load and tire applied to the top edge of the tread member pushes it over into normal position. It can't turn in the wrong direction on account of the projecting ends 17.

It is to be noted that the substantially circular ends 17, when turned over into the anti-skidding position shown in Fig. 6, diverge from each other. One object of that has been mentioned above but another object is to afford converging inner surfaces contacting with the ground so that the road material will tend to be crowded more and more between them as the device skids along, thus resisting skidding in a manner similar to that mentioned in connection with the groove 20.

Although I have illustrated and described only a single form of the invention, and shown it as an improvement on said patent, I am aware of the fact that modifications can be made therein by any person skilled in the art without departing from the scope of the invention as expressed in the claims. Therefore, I do not wish to be limited to all the details of construction herein shown and described, nor to the features shown or claimed in said patent, but what I do claim is:—

1. An anti-skid device of the character described, comprising a plurality of tread members adapted to engage the tread surface of a tire and each having its ends located on opposite sides of the tire and parallel flat flanges for engaging the ground, the opposite surface of said tread member being convex in one direction and concave in the direction at right angles thereto, the concave surface being adapted for engaging the tread surface of the tire, and means loosely connecting the ends of the several tread members on the opposite side surfaces of the tire.

2. As an article of manufacture, an anti-skid device for the purpose described, comprising a tread member having its inner surface longitudinally concave for engagement with the surface of the tire, the ends thereof diverging at an angle from each other and being perforated for receiving attaching devices, the outer or ground-contacting surface of said tread member having a groove extending therethrough and narrower in the center than at the ends to resist side slipping.

3. As an article of manufacture, an anti-skid device comprising a tread member having its inner surface longitudinally concave and transversely convex for engagement with the surface of the tire, the ends thereof being adapted for receiving attaching devices, the outer or ground-contacting surface of said tread member having a groove extending therethrough parallel with said convex surface, the edges of said tread member on opposite sides of said groove being thicker at the center than at the ends and parallel along their outer surfaces.

4. As an article of manufacture, an anti-skid device for the purpose described, comprising a tread member having its inner surface longitudinally concave and transversely convex for engagement with the surface of the tire, the ends thereof diverging from each other, the outer or ground-contacting surface of said tread member having a groove extending therethrough concentric with said convex surface, the edges of said tread member on opposite sides of said groove being thicker at the center than at the ends and flat and parallel along their outer surfaces and having angular projections at their ends adapted to dig into the ground if the tread member slips into an inclined position on the tire.

5. The combination with an anti-skid device comprising a tread member, the edges of said tread member being flat and thicker at the center than at the ends and having angular projections at their ends adapted to dig into the ground if the tread member slips into an inclined position on the tire, of means for mounting said tread member on a tire in such position that it will turn over about a quarter way around after the tire starts to skid.

6. As an article of manufacture, an anti-skid device comprising a metal body, the ends thereof being perforated for receiving attaching devices, and being wider than the rest of the tread member, whereby, when the tread member turns over, one edge of each end will constitute means for digging into the ground in front of the main body of said member to prevent skidding, said ends diverging from each other, whereby their lower edges will tend to crowd the dislodged portions of the road surface toward the center of the tread member and add to the resistance.

7. As an article of manufacture, a device for preventing side slipping of tires comprising tread members adapted to be attached to the tire and having thin centers on which the circumference of the tire normally bears and thick ends diverging inwardly which will be drawn under the tire in case of side slipping to afford additional resistance against the sliding of the tire sideways.

In testimony whereof I have hereunto affixed my signature.

HENRY ST. PIERRE.